United States Patent Office 3,150,058
Patented Sept. 22, 1964

3,150,058
PROCESS FOR PREPARING INOSINIC ACID
Hideo Katagiri, Kyoto-fu, Japan, Hideaki Yamada, Honolulu, Hawaii, and Koji Mitsugi, Kanagawa-ken, and Ryohei Aoki and Masahiro Takahashi, Tokyo, Japan, assignors to Ajinomoto Kabushiki Kaisha, Tokyo, Japan, a corporation of Japan
No Drawing. Filed Mar. 22, 1962, Ser. No. 181,823
Claims priority, application Japan, Aug. 9, 1960, 35/34,101; June 2, 1961, 36/19,114
18 Claims. (Cl. 195—28)

The present invention relates to a process for preparing inosinic acid by phosphorylating inosine using certain kinds of bacteria. This application is a continuation-in-part of application Serial No. 125,943, filed on July 24, 1961, and now abandoned.

The primary object of the invention resides in the provision of an improved method for the synthesis of inosinic acid on industrial scale.

Since sodium 5'-inosinate was found to have merit as a flavoring material, several methods for producing said substance have been publicized. Known methods, however, include the extraction or the decomposition and extraction of said substance from raw materials containing ribo-nucleic acid, and no industrial process has so far been established on the basis of chemical or biochemical synthesis.

We have discovered that 5'-inosinic acid may be produced from inosine and proper phosphate donors through the action of microorganisms, particularly bacteria belonging to the genera Flavobacterium, Serratia, Staphylococcus, and Pseudomonas that transfer the phosphate radical of the phosphate donor to the 5'-position of the ribose radical of inosine which is also called 6-hydroxypurine nucleoside. Thereby 6-hydroxypurine nucleoside 5'-monophosphate (i.e. 5'-inosinic acid) is synthesized as a final product.

The process for producing 5'-inosinic acid according to the present invention has the following advantages:

(1) The main starting material is inosine which is readily produced at a low price by chemical synthesis, fermentation process or extraction, (2) Unlike chemical phosphorylating methods, phosphorylation of inosine by bacteria is completed in one step in which inosine is turned into inosinic acid (we discovered that inosine was turned into either 2'- or 3'-inosinic acid, or 5'-inosinic acid through biochemical phosphorylation by microorganisms; the above mentioned bacteria, however, are specifically capable of producing and accumulating only 5'-inosinic acid (though Staphylococcus are exceptional; i.e. they produce a small amount of 3'-(2')-inosinic acid as by-products)), (3) These microorganisms are available as enzyme sources cheaply and amply, (4) By setting up suitable conditions, the rate of producing and accumulating 5'-inosinic acid may be easily enhanced.

The microorganisms applicable in the process of the invention include bacteria belonging to the genera Serratia, Flavobacterium, Pseudomonas, and Staphylococcus, which are easily isolated from natural fields, and which are capable of biochemical phosphorylation and specifically producing 5'-inosinic acid from inosine. The representative strains being usable for this invention are as follows: *Serratia marcescens, Flavobacterium fuscum, Flavobacterium harrisonii, Flavobacterium sulfureum, Flavobacterium flavescens, Pseudomonas trifolii, Pseudomonas perlurida, Pseudomonas melanogenum, Staphylococcus aureus, Staphylococcus citreus* and the like.

Strict comparison was bacteriologically carried out on *Pseudomonas melanogenum* nov. species with "Bergey's Determinative Bacteriology" and it was found that there was no description of any bacteria identified with said *Pseudomonas melanogenum*. It was regarded as a new species and duly so named.

CHARACTERISTICS OF *PSEUDOMONAS MELANOGENUM* NOV. SPECIES

Rods, 0.6 to 0.8 by 1.4 to 2.0 microns, occurring singly. Motile with a polar flagellum. Gram negative.
Nutrient agar colonies: Circular, smooth, entire to lobate, raised, translucent, pale yellowish gray, butyrous.
Nutrient agar slant: Moderate growth, filiform, glistening, translucent, light yellow. Medium becoming dark brown (nutrient agar containing 0.1% tyrosine becoming dark brown faster).
Glutamate agar slant: No growth.
Potato agar slant: Scanty growth.
Nutrient broth: Pellicle, strong turbidic.
Nutrient gelatin stab: Stratiform liquefaction.
Potato plug: Moderate growth, pale yellow.
Milk: Peptonized.
Litmus milk: Alkaline, peptonized, litmus reduced.
B.C.P. milk: Alkaline, peptonized.
Nitrate reduced to nitrite in nitrate broth and succinate nitrate.
Anaerobical growth with nitrate: Negative.
Indole not formed.
Hydrogen sulfide abundantly formed.
Starch not hydrolyzed.
Acetylmethyl carbinol not formed.
No acid or no gas from gylcerol, xylose, glucose, sucrose, lactose, and starch in peptone media and synthetic media.
Anaerobically no acid or no gas from glucose and lactose.
2-ketogluconate not formed from gluconate.
Not assimilated: glucose, gluconate, 2-ketogluconate, 5-ketogluconate, citrate, succinate, ethanol, phenol, benzoate, salicylate, m-hydroxybenzoate, p-hydroxybenzoate, protocatechuate, gentisate, anthranilate and p-aminobenzoate with ammonical nitrogen.
Cellulose, does not attack.
Non-water-soluble yellow pigments formed.
Catalase: Positive.
Optimum temperature: 25° C. to 30° C. No growth at 37° C. and 42° C.
Habitat: Soil.

The microorganisms cited above are prepared by submerged culture, stationary culture or surface culture at temperatures of from 20 to 37° C. for 10 to 50 hours in a medium containing suitable amounts of organic or inorganic nitrogen sources such as peptone, meat extract, corn-steep liquor, yeast extract, dry yeast, hydrolyzate of soybean meal, soybean meal extract and inorganic ammonium salts, and carbon sources such as molasses, glucose, hydrolyzate of starches and inorganic salts. Then the cultured bacteria are added to the phosphorylating reaction mixture in the form of a living cell suspension, treated cells such as dried cells, acetone powder, etc., crude extracts or enzyme preparation. Otherwise it is also possible to effect phosphorylation by adding required raw materials to the culture medium in either one of said forms.

Inosine, the starting material for processes according to the present invention, may have been synthesized chemically, or extracted from organisms, or else produced by fermentation processes. When those substances that may prevent this enzyme reaction are eliminated, any form of inosine is usable: i.e. readily applicable are crystalline inosine, crude inosine crystals, inosinic-containing solutions or culture mediums containing inosine.

When the inosine produced by fermentation is to be used, the inosine solution should be prepared in the following way: before proceeding with the reaction, a proper amount of either copper salt or zinc salt which are both capable of promoting the reaction as indicated hereafter should be added, and the insoluble protein that is precipitated by said salts and the cells should be removed. Then to the remaining solution are added the enzyme solution of said bacteria and phosphate donor. However, removing said precipitates is not required under certain conditions. When such nucleosides as adenosine and guanosine exist concurrently with inosine in the solution, corresponding 5'-nucleotides are produced as by-products, but their existence have no effect on the production of 5'-inosinic acid.

The phosphate donors applied in accordance with the process of the invention include phosphate compounds from natural sources and also synthetic organic phosphates that are useable in the phosphate transfer reaction by the said microorganisms. They are 5'-mononucleotides such as 5'-adenylic acid, 5'-cytidylic acid and 5'-uridylic acid, and aromatic phosphates such as p-nitrophenylphosphate, o-nitrophenylphosphate, phenylphosphate, benzylphosphate, etc. These phosphate compounds are usable either in the form of crystalline neutral salts, or in the form of solution, unless it prevents the desired reaction. Of the above said phosphate compounds, p-nitrophenylphosphate, which had never been used in nucleoside phosphate transfer reactions before we did, is the most efficient donor.

As stated above, the enzyme source of the present invention may be either a culture medium or the living cells. But there is one point to be duly noted in using them: they also have the undesirable effects relative to the purpose of the invention. These are the effects of nucleoside phosphorylase, nucleosidase, phosphatase and 5'-nucleotidase activities. The first two enzymes act to decompose inosine, the substrate; the rest decompose inosinic acid, the product. It is, therefore, of great importance to select conditions to check the activities of these enzymes in practice. As a result of our investigations, it has been found that the production and accumulation of 5'-inosinic acid was promoted by adding copper salts or zinc salts in suitable quantity to the reaction mixture, of which the pH value was kept as close as possible to acidity. Detailed explanation of the above is as follows: as shown in Table 1, the optimum pH of phosphomonoesterase and 5'-nucleotidase activities are at about 5.0, and these activities descend as the pH value declines, while a pH value of about 3.5 to 4.5 brings about the best production and accumulation of 5'-inosinic acid. Accordingly, the pH value should be kept as low as possible in order to prevent the decomposition of the product and at the same time to promote its production and accumulation. When $10^{-5}$ to $10^{-1}$ mole of copper salts or of zinc salts exist in the solution, the production and accumulation of 5'-inosinic acid can be greatly increased, which is evident from Table 2. The most suitable concentration of said metal salts are slightly different from each other, but preferably they lie between $10^{-3}$ and $10^{-2}$ mole. When these metal salts are used to treat the culture medium containing inosine, however, their concentrations should be a little higher than said limit. Chlorides or sulfates of copper or zinc salts are preferred (as shown in Table 3), although others that contain said metals may be used for the process. The combination effects of pH values and said metal salts are shown in Table 1 (in the parentheses of the column of nucleoside phosphotransferase activity) and in Table 2, where the molar yield of 5'-inosinic acid amounted to a maximum of 85% based on the inosine, charged under optimal conditions.

The temperature condition for the process matters little as long as the incubation proceeds, but preferably it should be near 37° C. as shown in Table 5.

The duration of incubation differs depending on the various conditions to be selected. It is evident, however, that it should be continued till the expected reaction reaches the maximum unless the decomposition of accumulated 5'-inosinic acid begins. During incubation stirring is desirable for better contact of the enzyme source with the raw materials.

Table 1.—Effect of pH on the Enzyme Activities

| pH | Nucleoside phosphotransferase activity (Molar yield of 5'-inosinic acid based on inosine added, percent) | Phosphomonoesterase activity (Rate of decomposition of p-nitrophenylphosphate, mole percent) | 5'-nucleotidase activity (Rate of decomposition of 5'-inosinic acid, mole percent) |
|---|---|---|---|
| 3.0 | 1.0 (3.6) | 1.9 | 5.0 |
| 3.6 | 11.5 (80.0) | 1.6 | 21.0 |
| 4.0 | 63.0 (88.0) | 9.9 | 27.2 |
| 4.6 | 68.0 (86.0) | 19.6 | 34.3 |
| 5.0 | 54.2 (81.0) | 25.7 | 38.4 |
| 5.5 | 53.0 (63.8) | 22.3 | 36.0 |
| 6.0 | 33.9 (52.0) | 21.4 | 31.0 |
| 7.0 | 27.4 (35.8) | 16.1 | 38.5 |
| 8.0 | 28.4 (24.7) | 16.7 | 43.5 |
| 9.0 | 30.3 (24.6) | 11.3 | 20.0 |

(I) *Estimation of nucleoside phosphotransferase activity.*—The reaction was carried out by adding a cell suspension of *Pseudomonas trifolii* (ATCC 14537), equivalent to 100 mg. of the cell as dry matter, to a reaction mixture containing 0.56 g. of inosine and 2.6 g. of sodium p-nitrophenylphosphate per 100 ml., and incubating the reaction mixture at various pH values and at 37° C. for 20 hours.

The estimated value written in ( ) shows the nucleoside phosphotransferase activity when $10^{-3}$ mole of zinc sulfate was added to the reaction mixture cited above.

(II) *Estimation of phosphomonoesterase activity.*—The reaction was carried out by adding a cell suspension of *Pseudomonas trifolii* (ATCC 14537), equivalent to 100 mg. of the cells as dry matter, to a reaction mixture containing 2.6 g. of sodium p-nitrophenylphosphate per 100 ml., and incubating the reaction mixture at various pH values and at 37° C. for 3 hours.

(III) *Estimation of 5'-nucleotidase activity.*—The reaction was carried out by adding a cell suspension of *Pseudomonas trifolii* (ATCC 14537), equivalent to 100 mg. of the cells as dry matter, to a reaction mixture containing 0.34 g. of 5'-inosinic acid per 100 ml. and incubating the reaction mixture at various pH values and at 37° C. for 3 hours.

Table 2.—Effect of Copper Ions and Zinc Ions

EFFECT OF CuSO₄.5H₂O

| Concentration of CuSO₄ added, mole | Nucleoside phosphotransferase activity (Molar yield of 5'-inosinic acid based on inosine added, percent) | Phosphomonoesterase activity (Rate of decomposition of p-nitrophenylphosphate, mole percent) | 5'-nucleotidase activity (Rate of decomposition of 5'-inosinic acid, mole percent) |
|---|---|---|---|
| 0 | 21.0 | 38.5 | 12.0 |
| $10^{-5}$ | 25.0 | 40.0 | 12.0 |
| $10^{-4}$ | 28.5 | 43.0 | 22.0 |
| $10^{-3}$ | 34.0 | 61.0 | 28.0 |
| $10^{-2}$ | 45.0 | 62.8 | 29.0 |

EFFECT OF ZnSO₄.7H₂O

| Concentration of ZnSO₄ added, mole | Nucleoside phosphotransferase activity (Molar yield of 5'-inosinic acid based on inosine added, percent) | Phosphomonoesterase activity (Rate of decomposition of p-nitrophenylphosphate, mole percent) | 5'-nucleotidase activity (Rate of decomposition of 5'-inosinic acid, mole percent) |
|---|---|---|---|
| 0 | 21.0 | 38.5 | 12.0 |
| $10^{-5}$ | 22.5 | 38.5 | 16.0 |
| $10^{-4}$ | 27.5 | 37.0 | 16.0 |
| $10^{-3}$ | 30.0 | 34.3 | 15.0 |
| $10^{-2}$ | 31.5 | 32.0 | 14.0 |

(I) *Estimation of nucleoside phosphotransferase activity.*—The reaction was carried out by adding a cell suspension of *Serratia marcescens* (ATCC 14227), equivalent to 250 mg. of the cells as dry matter, to a reaction mixture containing 0.535 g. of inosine and 2.6 g. of sodium p-nitrophenylphosphate per 100 ml. and various amounts of copper sulfate or zinc sulfate, and incubating the reaction mixture at a pH of 4.0 and at 37° C. for 24 hours.

(II) *Estimation of phosphomonoesterase activity.*— The reaction was carried out by adding a cell suspension of *Serratia marcescens* (ATCC 14227), equivalent to 250 mg. of the cells as dry matter, to a reaction mixture containing 2.6 g. of sodium p-nitrophenylphosphate per 100 ml. and various amounts of copper sulfate or zinc sulfate, and incubating the reaction mixture at a pH of 4.0 and at 37° C. for 24 hours.

(III) *Estimation of 5'-nucleotidase activity.*—The reaction mixture was carried out by adding a cell suspension of *Serratia marcescens* (ATCC 14227), equivalent to 250 mg. of the cells as dry matter to a reaction mixture containing 0.35 g. of 5'-inosinic acid per 100 ml. and various amounts of copper sulfate or zinc sulfate, and incubating the reaction mixture at a pH of 4.0 and at 37° C. for 6.5 hours.

*Table 2'.—Effect of Copper Ion and Zinc Ion*

EFFECT OF CuSO₄·5H₂O

| Concentration of CuSO₄ added, mole | Nucleoside phosphotransferase activity (Molar yield of 5'-inosinic acid based on inosine added, percent) | Phosphomonoesterase activity (Rate of decomposition of p-nitrophenylphosphate, mole percent) | 5'-nucleotidase activity (Rate of decomposition of 5'-inosinic acid, mole percent) |
|---|---|---|---|
| 0 | 53.5 | 20.0 | 26.0 |
| 10⁻⁵ | 57.0 | 20.0 | 27.0 |
| 10⁻⁴ | 65.0 | 22.5 | 33.0 |
| 10⁻³ | 75.0 | 36.8 | 40.0 |
| 10⁻² | 75.0 | 36.8 | 40.0 |
| 10⁻¹ | 74.0 | 38.7 | 42.0 |

EFFECT OF ZnSO₄·7H₂O

| Concentration of ZnSO₄ added, mole | Nucleoside phosphotransferase activity (Molar yield of 5'-inosinic acid based on inosine added, percent) | Phosphomonoesterase activity (Rate of decomposition of p-nitrophenylphosphate, mole percent) | 5'-nucleotidase activity (Rate of decomposition of 5'-inosinic acid, mole percent) |
|---|---|---|---|
| 0 | 53.5 | 20.0 | 26.0 |
| 10⁻⁵ | 71.0 | 20.0 | 26.0 |
| 10⁻⁴ | 78.0 | 20.0 | 24.0 |
| 10⁻³ | 83.5 | 19.0 | 28.0 |
| 10⁻² | 81.0 | 18.5 | 27.0 |
| 10⁻¹ | 72.0 | 18.5 | 24.0 |

(I) *Estimation of nucleoside phosphotransferase activity.*—The reaction was carried out by adding a cell suspension of *Pseudomonas trifolii* (IAM-1555) (ATCC 14537), equivalent to 250 mg. of the cells as dry matter, to a reaction mixture containing 0.535 g. of inosine, 2.6 g. of sodium p-nitrophenylphosphate per 100 ml. and various amounts of copper sulfate or zinc sulfate, and incubating the reaction mixture at a pH of 4.0 and at 37° C. for 20 hours.

(II) *Estimation of phosphomonoesterase activity.*— The reaction was carried out by adding a cell suspension of *Pseudomonas trifolii* (ATCC 14537), equivalent to 250 mg. of the cells as dry matter, to a reaction mixture containing 2.6 g. of sodium p-nitrophenylphosphate per 100 ml. and various amounts of copper sulfate or zinc sulfate, and incubating the reaction mixture at a pH of 4.0 and at 37° C. for 3 hours.

(III) *Estimation of 5'-Nucleotidase activity.*—The reaction mixture was carried out by adding a cell suspension of *Pseudomonas trifolii* (ATCC 14537), equivalent to 250 mg. of the cells as dry matter, to a reaction mixture containing 0.35 g. of 5'-inosinic acid per 100 ml. and various amounts of copper sulfate or zinc sulfate, and incubating the reaction mixture at a pH of 4.0 and at 37° C. for 3 hours.

*Table 3.—Effect of Copper Salt and Zinc Salt*

| Supplements | 5'-inosinic acid produced, g./dl. | p-nitrophenol liberated, g./dl. | Residual inosine, g./dl. | Utility of phosphate, percent |
|---|---|---|---|---|
| CuSO₄ (1 mM.) | 0.59 | 0.60 | 0.12 | 39.0 |
| CuCl₂ (1 mM.) | 0.57 | 0.64 | 0.14 | 36.7 |
| ZnSO₄ (1 mM.) | 0.65 | 0.46 | 0.08 | 56.4 |
| ZnCl₂ (1 mM.) | 0.66 | 0.45 | 0.08 | 58.6 |
| None | 0.42 | 0.33 | 0.25 | 51.0 |

Utility of phosphate is represented by the following equation:

$$\text{Utility of phosphate (percent)} = \frac{\text{Amounts of 5-inosinic acid produced (mole)}}{\text{Amounts of p-nitrophenol liberated (mole)}} \times 100$$

The reaction was carried out by adding a cell suspension of *Pseudomonas trifolii* (ATCC 14537), equivalent to 100 mg. of the cells as dry matter, to a reaction mixture containing 0.57 g. of inosine and 2.6 g. of sodium p-nitrophenylphosphate per 100 ml., and incubating the reaction mixture at a pH of 4.0 and at 37° C. for 20 hours.

*Table 4.—Effect of the Culture Time of the Bacteria Used on the Activity of Enzymes*

| Culture time, hrs. | Amounts of 5'-inosinic acid produced, g./dl. | Amounts of p-nitrophenol liberated, g./dl. | Utility of phosphate, percent |
|---|---|---|---|
| 7 | 0.28 | 0.30 | 52.0 |
| 14 | 0.28 | 0.32 | 47.0 |
| 24 | 0.35 | 0.43 | 43.0 |
| 38 | 0.34 | 0.52 | 37.0 |
| 48 | 0.34 | 0.51 | 38.5 |

The reaction was carried out by adding a cell suspension of *Serratia marcescens* (ATCC 14227) harvested after the culture times described in Table 4 as shown above, equivalent to 250 mg. of the cells as dry matter, to a reaction mixture containing 0.54 g. of inosine, 3.5 g. of sodium p-nitrophenyl phosphate and 24.9 mg. of copper sulfate per 100 ml., and incubating the reaction mixture at a pH value of 4.0 and at 37° C. for 24 hours.

*Table 5.—Effect of a Reaction Temperature on the Production of 5'-Inosinic Acid*

| Reaction temperature, ° C. | Amounts of 5'-inosinic acid produced, g./dl. | Amounts of p-nitrophenol liberated, g./dl. | Utility of phosphate, percent |
|---|---|---|---|
| 20 | 0.24 | 0.16 | 60.0 |
| 30 | 0.38 | 0.30 | 50.5 |
| 37 | 0.44 | 0.41 | 42.6 |
| 45 | 0.40 | 0.37 | 43.1 |

The reaction was carried out by adding a cell suspension of *Serratia marcescens* (ATCC 14227), equivalent to 250 mg. of the cells as dry matter, to a reaction mixture containing 0.54 g. of inosine, 2.6 g. of sodium p-nitrophenylphosphate and 24.9 mg. of copper sulfate per 100 ml. and incubating the reaction mixture at a pH of 4.0 and at the various temperatures described in Table 5 as shown above for 24 hours.

5'-inosinic acid which is produced and accumulated according to this invention may be isolated by any kind of conventional methods, for example, by various kinds of combination of ion exchange resin techniques, solvent extraction techniques and precipitation techniques. Taking the case of using nitrophenyl phosphate derivative as the phosphate donor, 5'-inosinic acid is isolated by separating the cells from the reaction mixture, extracting the liquid with an organic solvent such as toluene, ethyl acetate, butanols and the like to remove the nitrophenol derivatives and the remaining nitrophenylphosphate derivatives, recovering the 5'-inosinic acid fraction by an anion exchange resin, neutralizing and concentrating the liquid containing 5'-inosinic acid and adding ethyl alcohol to deposit the crystalline sodium 5'-inosinate.

The following examples are given by way of more detailed explanation of the process of this invention, and should not be construed as imposing any limitation thereon.

EXAMPLE 1

*Flavobacterium flavescens* (ATCC 14231) was aerobically cultured in a medium containing 1% of peptone, 1% of meat extracts and 0.5% of sodium chloride, at a pH of 7.0 and at 30° C. for 17 hours and the cells were harvested therefrom. One portion of the harvested cells was dried under a reduced pressure to give the dried cells. The other portion was treated with acetone to give the acetone powder.

The reaction was carried out by adding the cell suspension and the dried cells or acetone powder obtained as described above as an enzyme source to the reaction mixture containing 0.54 g. of inosine, 2.6 g. of sodium p-nitrophenylphosphate and 24.9 g. of copper sulfate pentahydrate per 100 ml., and incubating the reaction mixture at a pH of 5.0 and at 37° C. for 24 hours.

The amounts of 5'-inosinic acid obtained are given in table below:

| Type of enzyme source | Amount of cells used, mg. as dry matter per dl. | Amount of 5'-inosinic acid produced, g./dl. | Molar yield of 5'-inosinic acid based on inosine added, percent |
|---|---|---|---|
| Cell suspension | 250 | 0.21 | 30.2 |
| Dried cell | 250 | 0.23 | 33.0 |
| Acetone powder | 250 | 0.20 | 28.7 |

EXAMPLE 2

A cell suspension of *Serratia marcescens* F420 (ATCC 14227) was harvested by culturing this bacterium under the same conditions as those of Example 1.

The reaction was carried out by adding the cell suspensions, equivalent to 200 mg. of the cell as dry matter, thus obtained as an enzyme source to a reaction mixture containing inosine and sodium p-nitrophenylphosphate in the various concentrations described in the table below, 24.9 mg. of copper sulfate pentahydrate and 4.2 mg. of sodium fluoride per 100 ml., and incubating the reaction mixture at a pH of 5.0 and at 37° C. for 24 hours.

The amounts of 5'-inosinic acid produced are given in the table:

| Experiment No. | Concentration of substrate in the reaction mixture | | Amounts of 5'-inosinic acid obtained, g./dl. | Molar yield of 5'-inosinic acid based on inosine added, percent |
|---|---|---|---|---|
| | Inosine, g./dl. | Sodium p-nitrophenylphosphate, g./dl. | | |
| 1 | 0.27 | 1.5 | 0.14 | 40.0 |
| 2 | 0.27 | 2.6 | 0.19 | 54.6 |
| 3 | 0.27 | 3.7 | 0.21 | 60.0 |
| 4 | 0.27 | 4.8 | 0.22 | 63.3 |
| 5 | 0.54 | 1.5 | 0.28 | 40.3 |
| 6 | 0.54 | 2.6 | 0.30 | 43.0 |
| 7 | 0.54 | 3.7 | 0.34 | 48.8 |
| 8 | 0.54 | 4.8 | 0.33 | 47.5 |
| 9 | 0.79 | 1.5 | 0.31 | 30.2 |
| 10 | 0.79 | 2.6 | 0.37 | 36.0 |
| 11 | 0.79 | 3.7 | 0.41 | 39.8 |
| 12 | 0.79 | 4.8 | 0.42 | 40.6 |

EXAMPLE 3

Twenty-five ml. of a cell suspension of *Serratia marcescens* (IAM-181-8) (ATCC 14226) (0.16 g. of the cells as dry matter per ml.) were prepared by aerobically culturing this bacterium at 30° C. for 38 hours in a medium containing 1.2 ml. of the hydrolysate of soybean meal having total nitrogen of 24 mg./ml., 1 g. of glucose, 0.3 g. of primary potassium phosphate and 0.1 g. of magnesium sulfate heptahydrate per 100 ml. at a pH of 7.8.

On the other hand, 7.5 g. of copper sulfate pentahydrate were added to 1 liter of a culture medium containing inosine with stirring and mild heating, and the cells and precipitates were removed by centrifuging.

The reaction was carried out by adding 25 ml. of the cell suspension obtained as described above to 970 ml. of the reaction mixture containing the inosine solution obtained as described above and 26 g. of sodium p-nitrophenylphosphate and incubating this reaction mixture at a pH of 4.0 and at 37° C. for 15 hours.

At the end of incubation, 0.46 g. of 5'-inosinic acid were produced and accumulated per 100 ml., which corresponded to a molar yield of 61.5% based on the initial concentration of inosine, and 0.22 g. of inosine remained unreacted per 100 ml. The rate of decomposition of p-nitrophenylphosphate corresponded to 42.8%.

The 5'-inosine acid produced was separated by centrifuging the cells from the reaction mixture, extracting and removing the p-nitrophenol liberated with about 1 liter of ethyl acetate, evaporating the unextracted aqueous solution to dryness under reduced pressure, then extracting the residues with about 1 liter of hot ethanol several times, cooling the ethanol extracts, filtrating the precipitates, dissolving the resulting precipitates and residues unextracted with ethanol in water, adjusting the pH value of the aqueous solution at about 4.0, passing the aqueous solution through a column packed with 0.4 liter of Dowex-1X8 (trade name of an anion exchange resin) having chloride form, washing the column with water, eluting the column with 2 liters of the mixture of 0.01 normal of hydrochloric acid with 0.1 normal of sodium chloride, collecting the fraction of 5'-inosinic acid eluted, neutralizing the eluate with an aqueous sodium hydroxide solution, concentrating the solution under reduced pressure, and adding ethanol to the concentrate to give 3.72 g. of the crude crystals of sodium 5'-inosinate.

EXAMPLE 4

The cell suspension of *Flavobacterium sulfureum* (B-121-10) (ATCC 14232) was prepared by aerobically culturing this bacterium in the soybean meal extract solution neutralized with ammonia at 30° C. for 24 hours.

The reaction was carried out by adding 10 ml. of the cell suspension obtained as described above, which has 25 mg. of the cells as dry matter per ml., to 190 ml. of the reaction mixture containing 1.08 g. of inosine, 5.2 g. of sodium p-nitrophenylphosphate and 58 mg. of copper sulfate pentahydrate at a pH of 4.0 and incubating the reaction at 37° C. for 24 hours.

At the end of incubation, 0.44 g. of 5'-inosinic acid was accumulated per 100 ml. of the reaction mixture. This represented 62.3% of the molar yield based on the initial concentration of inosine. The reaction mixture of 195 ml. was treated in a manner similar to that of Example 3 to give 0.65 g. of the crude crystals of sodium 5'-inosinate.

EXAMPLE 5

A cell suspension of *Staphylococcus citreus* (ATCC 4012) was prepared by aerobically culturing this bacterium at 30° C. for 24 hours in a medium containing 1% of peptone, 1% of meat extracts and 0.5% of sodium chloride at a pH of 7.0.

The reaction was carried out by adding the cell suspension, equivalent to 250 mg. of the cell as dry matter, to a reaction mixture containing 0.54 g. of inosine, 2.6 g. of sodium p-nitrophenylphosphate and 25 mg. of copper sulfate pentahydrate per 100 ml., and incubating this reaction mixture at a pH of 4.0 and at 37° C. for 24 hours. At the end of incubation, there was accumulated 0.46 g. of inosinic acid which consisted of a major part of 5'-inosinic acid and about 15% of 3'-(or 2'-)inosinic acid.

0.32 g. of the crude crystals of sodium inosinate was obtained by treating 97 ml. of the reaction mixture in the same manner as that of Example 3.

EXAMPLE 6

The cell suspensions of the various bacteria described in table below were prepared by culturing each of the bacteria in the same medium as that of Example 1.

The reaction was carried out by adding a cell suspension of each bacteria, equivalent to 400–600 mg. of the cells as dry matter, as described above, to a reaction mixture containing 0.536 g. of inosine, 3.5 g. of sodium p-nitrophenylphosphate, 24.9 g. of copper sulfate pentahydrate and 4.2 mg. of sodium fluoride per 100 ml., and incubating this reaction mixture at a pH of 5.0 and at 37° C. for 24 hours.

The amounts of 5'-inosinic acid accumulated are given in the table below:

Table

| Type of strain used | Amount of 5'-inosinic acid produced, g./dl. | Molar yield of 5'-inosinic acid based on inosine added, percent | Unreacted inosine, g./dl. | Utility of phosphate, percent |
|---|---|---|---|---|
| Flavobacterium fuscum (ATCC 14233) | 0.09 | 13.0 | 0.19 | 22.5 |
| Flavobacterium breve (S-11) (ATCC 14234) | 0.22 | 32.0 | 0.36 | 14.1 |
| Flavobacterium lactis | 0.24 | 33.5 | 0.33 | 14.5 |
| Serratia marcescens (F-450) (ATCC 14223) | 0.36 | 50.1 | 0.20 | 51.0 |
| Serratia marcescens (F-93) (ATCC 14224) | 0.28 | 26.7 | 0.35 | 43.3 |

EXAMPLE 7

The cell suspensions of the various bacteria described in the table below were prepared by culturing each of the bacteria in the same medium as that of Example 6.

The reaction was carried out by adding a cell suspension of each bacteria, equivalent to 250 mg. of the cells as dry matter, as described above to a reaction mixture containing 0.54 g. of inosine, 2.6 g. of sodium p-nitrophenyl phosphate and 24.9 mg. of copper sulfate pentahydrate per 100 ml., and incubating this reaction mixture at a pH of 4.0 and at 37° C. for 24 hours.

The amounts of 5'-inosinic acid accumulated are given in table as below:

Table

| Type of strain used | Amount of 5'-inosinic acid produced, g./dl. | Molar yield of 5'-inosinic acid based on inosine added, percent | Unreacted inosine, g./dl. | Utility of phosphate, percent |
|---|---|---|---|---|
| Flavobacterium flavescens (ATCC 14231) | 0.39 | 55.0 | 0.21 | 41.5 |
| Serratia marcescens (IAM-181-5) (ATCC 14225) | 0.50 | 68.0 | 0.15 | 48.5 |
| Staphylococcus aureus (B-71-1) (ATCC 14222) | 0.30 | 41.0 | 0.30 | 35.8 |
| Staphylococcus aureus FAD 209 P | 0.51 | 73.0 | 0.16 | 41.7 |

In the experiments using *Staphylococcus aureus*, a small amount of 3'-(2'-)inosinic acid was accumulated besides the desired 5'-inosinic acid. Total amounts of these inosinic acid isomers are given in the above table.

EXAMPLE 8

The cell suspension of *Pseudomonas trifolii* (IAM-1555) (ATCC 14537), equivalent to 112 mg. of the cells as dry matter per ml., was prepared by culturing the said bacteria at 30° C. for 15 hours in the same medium as that of Example 1.

The reaction was carried out by adding 25 ml. of the cell suspension obtained as described above, 52 g. of sodium p-nitrophenylphosphate and 1.87 g. of zinc sulfate to 1.97 liter of the supernatant of the culture medium containing inosine, adjusting the pH value of the reaction mixture to 4.0 and incubating the reaction mixture at 37° C. for 40 hours.

The initial concentration of inosine, 0.77 g./dl., in the mixture was reduced to 0.23 g./dl. at the end of this reaction, yielding and accumulating 0.73 g./dl. of 5'-inosinic acid, which corresponded to the molar yield of 73% based on inosine added. The decomposition of p-nitrophenylphosphate corresponded to 50%. The reaction mixture was treated as described in Example 3 to give 11.6 g. of the crude crystals of sodium 5'-inosinate.

EXAMPLE 9

A cell suspension of *Pseudomonas trifolii* (IAM-1555) (ATCC 14537) was prepared by culturing the bacteria in the soybean meal extract neutralized with ammonia at 30° C. for 26 hours with shaking.

On the other hand, 7.5 g. of copper sulfate were added to 1 liter of the culture medium containing inosine and a solution was then warmed under with stirring, centrifuged and freed from the cells and precipitates.

After 26 g. of sodium p-nitrophenylphosphate were added to 0.97 liter of the supernatant, the pH was adjusted to a pH of 4.0. The cell suspension obtained as described above was then added thereto in an amount corresponding to 850 mg. of the cells as dry matter per 1 liter of said supernatant and the reaction was carried out by incubating the resulting reaction mixture at 35° C. for 15 hours. 0.56 g. of 5'-inosinic acid (corresponding to the molar yield of 71.6% based on the initially charged inosine) was produced and accumulated per 100 ml. of the reaction mixture and 0.17 g. of inosine remained unreacted.

The rate of decomposition of p-nitrophenylphosphate corresponded to 52%, in which 43% of it was utilized to produce 5'-inosinic acid.

According to the same procedure as described in Example 3, 4.1 g. of crude crystals of sodium 5'-inosinate were obtained.

EXAMPLE 10

A cell suspension of *Pseudomonas perlurida* (IAM-1610) (ATCC 14536), equivalent to 80 mg. of the cells as dry matter per ml., was prepared by culturing this bacterium at 30° C. for 16 hours with shaking in a medium containing 1 g. of glucose, 1.2 ml. of soybean meal hydrosate, 0.3 g. of $KH_2PO_4$, 0.1 g. of $MgSO_4 \cdot 7H_2O$ and 1 g. of $CaCO_3$ per 100 ml.

The reaction was carried out by adding 25 ml. of the cell suspension obtained as described above, and 544 mg. of zinc sulfate and 26 g. of sodium p-nitrophenylphosphate, to 0.97 liter of the supernatant of the culture medium containing inosine, adjusting the pH value of the mixture to 4.0 and incubating the reaction mixture at 37° C. for 20 hours.

0.5 g. of 5'-inosinic acid (corresponding to the molar yield of 70.5% based on the initially charged inosine) was thus produced per 100 ml., and 0.19 g. of inosine remained unreacted per 100 ml. The rate of decomposition of p-nitrophenylphosphate was 49.0%.

According to the same procedure as described in Example 3, 4.5 g. of crude crystals of sodium 5'-inosinate was produced.

EXAMPLE 11

A cell suspension of *Pseudomonas trifolii* (IAM–1555) (ATCC 14537) was prepared according to the same procedure as that of Example 1.

The reaction was carried out by adding 5 ml. of said cell suspension (equivalent to 17 mg. of the cells as dry matter per ml.) to 95 ml. of a reaction mixture containing 0.56 g. of inosine, 1.52 g. of sodium phenylphosphate and 28.7 mg. of zinc sulfate and incubating the resulting mixture at a pH of 4.2 at 37° C. for 18 hours. 0.17 g. of 5'-inosinic acid was thus produced and accumulated per 100 ml. The unreacted inosine amounted to 0.45 g. per 100 ml. and 16.6% of the phenylphosphate charged was decomposed.

Immediately after freed from the bacterial cells, the reaction mixture was adsorbed on and eluted through the anion exchange resin; Dowex 1X4 (chloride ion type). Sodium 5'-inosinate, 178 mg., was thus obtained as crude crystals.

EXAMPLE 12

A cell suspension of *Pseudomonas melanogenum* (IAM–1588) (ATCC 14535) was prepared by culturing the bacteria in the same procedure as that of Example 1.

The reaction was carried out by adding 5 ml. of said cell suspension (equivalent to 40 mg. of the cells as dry matter per ml.) to 95 ml. of a reaction mixture (pH=4.0) containing 0.56 g. of inosine, 2.6 g. of p-nitrophenylphosphate and 28.7 mg. of zinc sulfate, and incubating the resulting solution at 37° C. for 25 hours.

0.24 g. of 5'-inosinic acid was resultantly produced and accumulated, leaving 0.38 g. of inosine unreacted per 100 ml. The rate of decomposition of p-nitrophenylphosphate was 39.2%.

The reaction mixture, freed from the bacterial cells, was adsorbed on and eluted through the anion exchange resin: Dowex 1X8 (chlorine ion type), treated in the same manner as described in Example 3, neutralized and concentrated, and upon the addition of ethanol thereto, 0.26 g. of crude crystals of sodium 5'-inosinic acid yielded.

EXAMPLE 13

A cell suspension of *Pseudomonas trifolii* (IAM–1555) (ATCC 14537), equivalent to 22.6 mg. of the cells as dry matter per ml., was prepared by culturing the bacteria in the same medium as that of example 10.

3.99 liter of the supernatant of the culture medium containing inosine treated according to Example 8 was charged with 5.76 g. of zinc sulfate, 104.5 g. of sodium p-nitrophenylphosphate and 86 ml. of the cell suspension described above and the reaction was carried out by incubating the solution at a pH of 4.0 and at 30° C. for 24 hours with stirring it occasionally. 0.88 g. of 5'-inosinic acid per 100 ml., corresponding to the molar yield of 84.4% based on the inosine added, was produced and accumulated and 0.13 g. of the inosine unreacted per 100 ml. The decomposition of p-nitrophenylphosphate was 59.3%, of which 61% was utilized to produce inosinic acid.

According to the same procedure as described in Example 3, 32.5 g. of the crude crystals of sodium 5'-inosinate was obtained.

EXAMPLE 14

*Pseudomonas trifolii* (IAM–1555) (ATCC 14537) was cultured by submerged culture in a medium containing 2 g. of glucose, 10 ml. of soybean meal hydrosate, 0.3 g. of $KH_2PO_4$, 0.1 g. of $MgSO_4.7H_2O$ and 1 g. of $CaCO_3$ per 100 ml. at 30° C. for 20 hours.

The reaction was carried out by adding 150 ml. of the culture medium of Pseudomonas described above with 23 g. of sodium p-nitrophenylphosphate and 490 mg. of zinc sulfate to 750 ml. of the culture medium containing inosine and incubating the resulting solution at pH 4.0 and at 37° C. for 40 hours. The initial concentration of inosine in the reaction mixture was 0.56 g./dl., and 5'-inosinic acid at the end of the reaction was 0.46 g./dl. (corresponding to the molar yield of 63.2% based on the initially charged inosine). After being freed from insoluble substances and bacterial cells by centrifuging, the reaction mixture was treated in the same manner as described in Example 3 and 3.62 g. of crude crystals of sodium 5'-inosinate were finally prepared.

EXAMPLE 15

A cell suspension of *Pseudomonas trifolii* (IAM–1555) (ATCC 14537), equivalent to 22.6 mg./ml. of the cells as dry matter, was prepared by culturing the bacteria in the same medium as that of Example 10.

The reaction was carried out by adding 4 ml. of the cell suspension obtained as described above, to 96 ml. of a reaction mixture (pH=4.0) containing 0.56 g. of inosine, 1.39 g. of 5'-adenylic acid and 28.7 mg., of zinc sulfate, and incubating it at 37° C. for 24 hours.

0.27 g. of 5'-inosinic acid was produced and accumulated per 100 ml., corresponding to the molar yield of 39% based on inosine initially charged. The supernatant liquid of the reaction mixture freed from bacterial cells by centrifuging was passed and eluted through the anion exchange resin Dowex–1X4 (chlorine ion type) by conventional technique, neutralized, concentrated and 0.37 g. of crude crystals of sodium 5'-inosinate obtained by addition of ethanol to the concentrated solution.

EXAMPLE 16

The reaction was carried out by adding 4 ml. of a cell suspension of *Pseudomonas trifolii* (IAM–1555) (ATCC 14537) to 96 ml. of a reaction mixture containing 0.56 g. of inosine, 1.29 g. of 5'-cytidylic acid and 28.7 mg. of zinc sulfate and incubating it at 37° C. for 24 hours according to the procedure of Example 15. 0.23 g./dl. of 5'-inosinic acid (molar yield being 32.6% based on inosine charged) was produced and accumulated. According to the same procedure as described in Example 15, 0.3 g. of sodium 5'-inosinate was obtained.

EXAMPLE 17

According to the procedure of Example 15, the reaction was carried out by adding 4 ml. of a cell suspension of *Pseudomonas trifolii* (IAM–1555) (ATCC 14537) to 96 ml. of a reaction mixture containing 0.56 g. of inosine, 1.47 g. of 5'-uridylic acid and 28.7 mg. of zinc sulfate, and by incubating the mixture at a pH of 4.0 and at 37° C. for 24 hours. 0.29 g./dl. of 5'-inosinic acid was obtained corresponding to the molar yield of 41.5% based on charged inosine. According to the same procedure as described in Example 15 0.38 g. of sodium 5'-inosinate was obtained.

EXAMPLE 18

According to the procedure of Example 15, the reaction was carried out by adding 4 ml. of a cell suspension of *Pseudomonas trifolii* (IAM–1555) (ATCC 14537) to 96 ml. of a reaction mixture containing 0.56 g. of inosine, 1.3 g. of barium benzyl phosphate and zinc sulfate and incubating the mixture at a pH of 4.0 and at 37° C. for 24 hours. 0.21 g./dl. of 5'-inosinic acid was produced and accumulated as the result and the molar yield found to be 30% based on the amount of initially charged inosine. According to the same procedure as described in Example 15, 0.28 g. of sodium 5'-inosinate was obtained.

EXAMPLE 19

In the same manner as described in Example 15, the reaction was carried out by adding 4 ml. of a cell suspension of *Pseudomonas trifolii* (IAM–1555) (ATCC 14537) to 96 ml. of a reaction mixture containing 0.56 g. of inosine, 1.9 g. of sodium o-nitrophenylphosphate and 28.7 mg. of zinc sulfate and incubating the mixture at a pH of 4.0 and at 37° C. for 24 hours. 0.05 g./dl. of 5'-inosinic acid resulted and the molar yield found to be 7% based on the initially charged inosine.

EXAMPLE 20

A cell suspension of *Flavobacterium harrisonii* (ATCC 14589) was prepared by culturing this bacterium under the same conditions as those of Example 10.

The reaction was carried out by adding the cell suspension (equivalent to 45 mg./ml. of the cell as dry matter) to 950 ml. of a reaction mixture containing 5.6 g. of inosine, 26 g. of sodium p-nitrophenylphosphate and 287 mg. of zinc sulfate, and incubating the reaction mixture at a pH of 4.0 and at 37° C. for 24 hours. At the end of this reaction, 0.59 g./dl. of 5'-inosinic acid was produced and accumulated, which corresponded to the molar yield of 84.4% based on the charged inosine, and 0.08 g./dl. of inosine remained unreacted. The decomposition of p-nitrophenylphosphate was found to be 41.8%. The reaction mixture was then treated in the same procedure as that of Example 3 to give 5.2 g. of the crude crystals of sodium 5'-inosinate.

What we claim is:

1. A process for producing 5'-inosinic acid which comprises combining an enzyme source, having a nucleoside phosphotransferase activity to form 5'-inosinic acid from inosine and a phosphate donor, prepared from a microorganism selected from the genera Flavobacterium, Serratia, Staphylococcus and Pseudomonas, with a solution containing inosine and a phosphate donor to form a reaction mixture, and subjecting the said mixture to a biochemical phosphorylation of inosine therein in a pH range of 3.0 to 9.0, and recovering thusly formed 5'-inosinic acid therefrom.

2. A process as claimed in claim 1 wherein the solution is further provided with a metal ion selected from the group constsing of copper and zinc ions.

3. A process as set forth in claim 1, wherein said microorganism is selected from the group consisting of *Flavobacterium flavescens*, *Fl. sulfureum*, *Fl. fuscum*, *Fl. breve*, *Fl. lactis*, *Fl. harrisonii*, *Serratia marcescens*, *Staphylococcus citreus*, *St. aureus*, *Pseudomonas trifolii*, *Ps. perlurida* and *Ps. melanogenum*.

4. A process as set forth in claim 2, wherein said microorganism is selected from the group consisting of *Flavobacterium flavescens*, *Fl. sulfureum*, *Fl. fuscum*, *Fl. breve*, *Fl. lactis*, *Fl. harrisonii*, *Serratia marcescens*, *Staphylococcus citreus*, *St. aureus*, *Pseudomonas trifolii*, *Ps. perlurida* and *Ps. melanogenum*.

5. A process as set forth in claim 3, wherein said microorganism is selected from the group consisting of *Flavobacterium flavescens* ATCC 14231, *Fl. fuscum* ATCC 14233, *Fl. sulfureum* ATCC 14232, *Fl. breve* ATCC 14223, *S. marcescens* ATCC 14225, *S. marcescens* ATCC 14226, *S. marcescens* ATCC 14227, *Staphylococcus citreus* ATCC 4012, *St. aureus* ATCC 14222, *Pseudomonas trifolii* ATCC 14537, *Ps. perlurida* ATCC 14536 and *Ps. melanogenum* ATCC 14535.

6. A process as set forth in claim 4, wherein said microorganism is selected from the group consisting of *Flavobacterium flavescens* ATCC 14231, *Fl. fuscum* ATCC 14233, *Fl. sulfureum* ATCC 14232, *Fl. breve* ATCC 14223, *S. marcescens* ATCC 14225, *S. marcescens* ATCC 14226, *S. marcescens* ATCC 14227, *Staphylococcus citreus* ATCC 4012, *St. aureus* ATCC 14222, *Pseudomonas trifolii* ATCC 14537, *Ps. perlurida* ATCC 14536 and *Ps. melanogenum* ATCC 14535.

7. A process as set forth in claim 5, wherein said phosphate donor is selected from the group consisting of p-nitrophenylphosphate, o-nitrophenylphosphate, phenylphosphate, benzyl phosphate, 5'-adenylic acid, 5'-cytidylic acid, 5'-uridylic acid and mixtures of said compounds.

8. A process as set forth in claim 6, wherein said phosphate donor is selected from the group consisting of p-nitrophenylphosphate, o-nitrophenylphosphate, phenylphosphate, benzyl phosphate, 5'-adenylic acid, 5'-cytidylic acid, 5'-uridylic acid and mixtures of said compounds.

9. A process as set forth in claim 5, wherein said phosphorylation is carried out at a pH range of 3.5–5.0.

10. A process as set forth in claim 6, wherein said phosphorylation is carried out at a pH range of 3.5–5.0.

11. A process as claimed in claim 5 wherein the microorganism is employed in the form of a culture medium.

12. A process as claimed in claim 5 wherein the microorganism is employed in the form of a cell suspension.

13. A process as claimed in claim 5 wherein the microorganism is employed in the form of dried cells.

14. A process as claimed in claim 5 wherein the enzyme source is employed in the form of a crude extract.

15. A process as claimed in claim 5 wherein the microorganism is employed in the form of a culture medium.

16. A process as claimed in claim 6 wherein the microorganism is employed in the form of a cell suspension.

17. A process as claimed in claim 6 wherein the microorganism is employed in the form of dried cells.

18. A process as claimed in claim 6 wherein the enzyme source is employed in the form of a crude extract.

References Cited in the file of this patent

Brawerman et al.: JACS 75, 2020–2021 (1953).
Buchanan et al.: Advances in Enzymology, vol. 21, pp. 199–261 (1959), Interscience Publishers Inc., New York.